United States Patent
Hsu et al.

(10) Patent No.: US 8,242,788 B2
(45) Date of Patent: Aug. 14, 2012

(54) CALIBRATION APPARATUS AND METHOD FOR CAPACITIVE SENSING DEVICES

(75) Inventors: Yu-Wen Hsu, Tainan (TW); Lu-Po Liao, Taipei (TW); Chieh-Ling Hsiao, Tainan (TW); Yu-Chun Hsu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 489 days.

(21) Appl. No.: 12/645,473

(22) Filed: Dec. 22, 2009

(65) Prior Publication Data

US 2011/0101994 A1 May 5, 2011

(30) Foreign Application Priority Data

Nov. 4, 2009 (TW) .............................. 98137439 A (51) Int. Cl.
*G01R 35/00* (2006.01)
*G01R 27/02* (2006.01)
*G01R 27/26* (2006.01)

(52) U.S. Cl. .................... 324/601; 324/607; 324/679

(58) Field of Classification Search ............ None
See application file for complete search history.

(56) References Cited

U.S. PATENT DOCUMENTS

| 4,820,971 | A | * | 4/1989 | Ko et al. ..................... 324/679 |
| 5,528,520 | A | | 6/1996 | Kemp |
| 5,604,684 | A | | 2/1997 | Juntunen |
| 5,659,262 | A | | 8/1997 | Memishian |
| 5,661,240 | A | * | 8/1997 | Kemp ...................... 73/514.32 |
| 7,155,979 | B2 | | 1/2007 | Lasalandra et al. |
| 7,461,553 | B2 | | 12/2008 | Lasalandra et al. |

* cited by examiner

*Primary Examiner* — Paresh Patel (74) *Attorney, Agent, or Firm* — Lin & Associates IP, Inc.

(57) ABSTRACT

A calibration apparatus and method for a capacitive sensing device, in which a calibration capacitor device connects to the capacitive sensing device which is connected to an integration circuit that generates a voltage output and a latch output, a transforming circuit transforms a sensitivity calibration parameter into a pair of corresponding analog signal outputs, and an offset calibration parameter into a corresponding analog signal output, at least two first switches between the pair of corresponding analog signal outputs and a fixed potential according to system clock's levels, and at least a third switch switches between the corresponding analog signal output and another fixed potential according to the system clock's levels. The apparatus determines the switch between the pair of signal outputs according to the latch output.

25 Claims, 13 Drawing Sheets

CALIBRATION APPARATUS AND METHOD FOR CAPACITIVE SENSING DEVICES

TECHNICAL FIELD

The disclosed generally relates to a calibration apparatus and method for capacitive sensing devices.

BACKGROUND

The capacitance and capacitance sensitivity of capacitive sensing devices usually deviate from the design due to the non-ideal manufacturing and assembly process. Not only the capacitances of the components in a device may vary, but also the capacitance sensitivity of the components in the device may vary. This type of capacitance error and capacitance sensitivity error, through the amplification of the reading circuit, will be reflected to the zero-offset and the capacitance sensitivity for the overall device. Hence, the calibration method and circuit must be used to rectify the zero-offset and capacitance sensitivity back to within the specification tolerance.

Several calibration technologies for device offset are disclosed, such as, U.S. Pat. No. 5,659,262, U.S. Pat. No. 7,155,979, and U.S. Pat. No. 7,461,553. U.S. Pat. No. 5,659,262 disclosed a technology for offset trimming for a micromachined sensing device, using variable resistor to change the amplitude of input signal so as to control the voltages on the capacitor plates to achieve compensating the drift during the manufacturing process.

U.S. Pat. No. 7,155,979 and U.S. Pat. No. 7,461,533 disclosed self-calibrating oversampling electromechanical modulator and self-calibration method, for detecting the values at the equilibrium state, and calibrating the device's offset by changing the value of calibration capacitance.

Figure 1A:
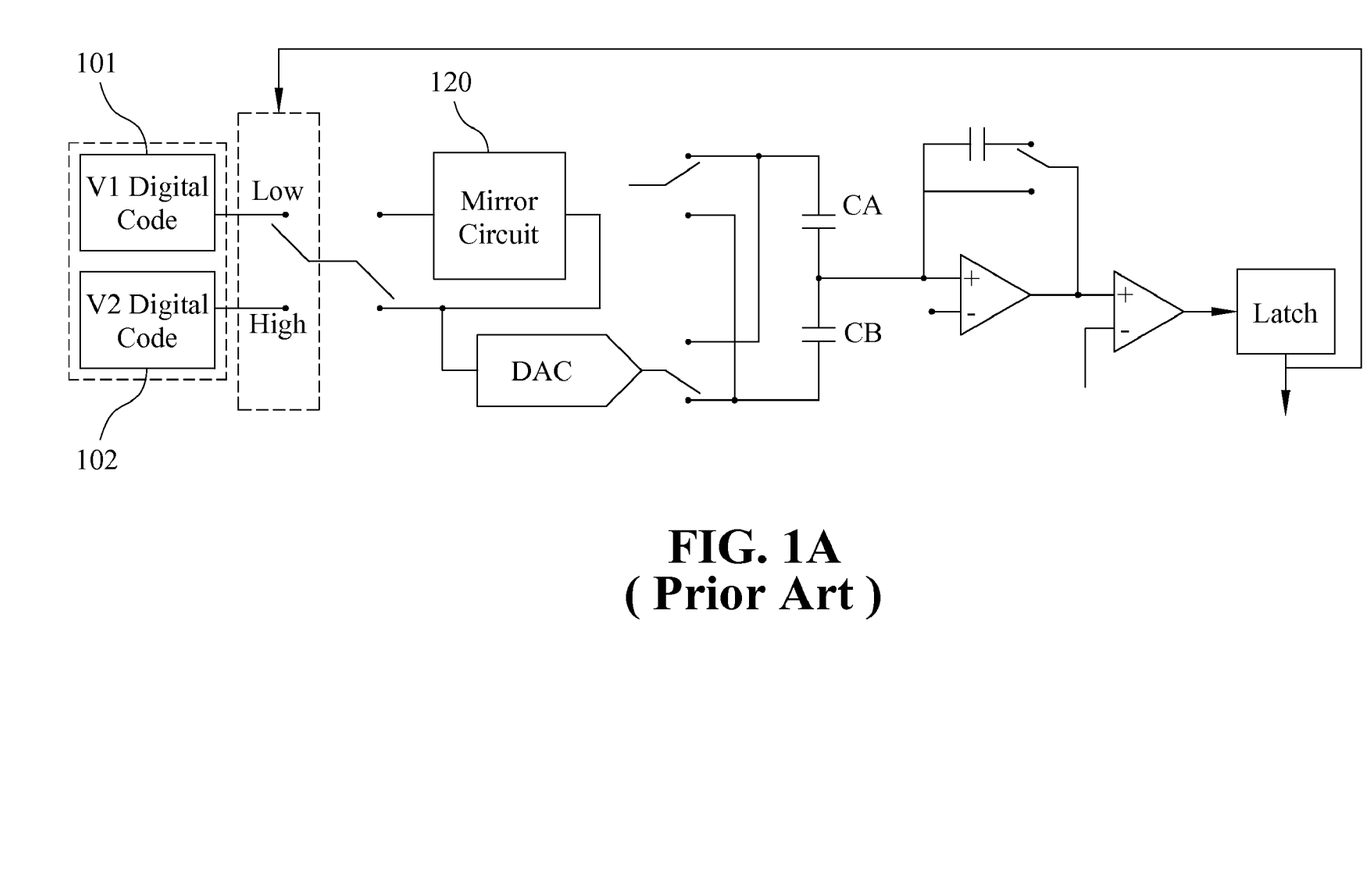
FIG. 1A and FIG. 1B are exemplary schematic views, illustrating a calibration circuit and method for any offsets or sensitivity variation of devices.
Figure 1B:
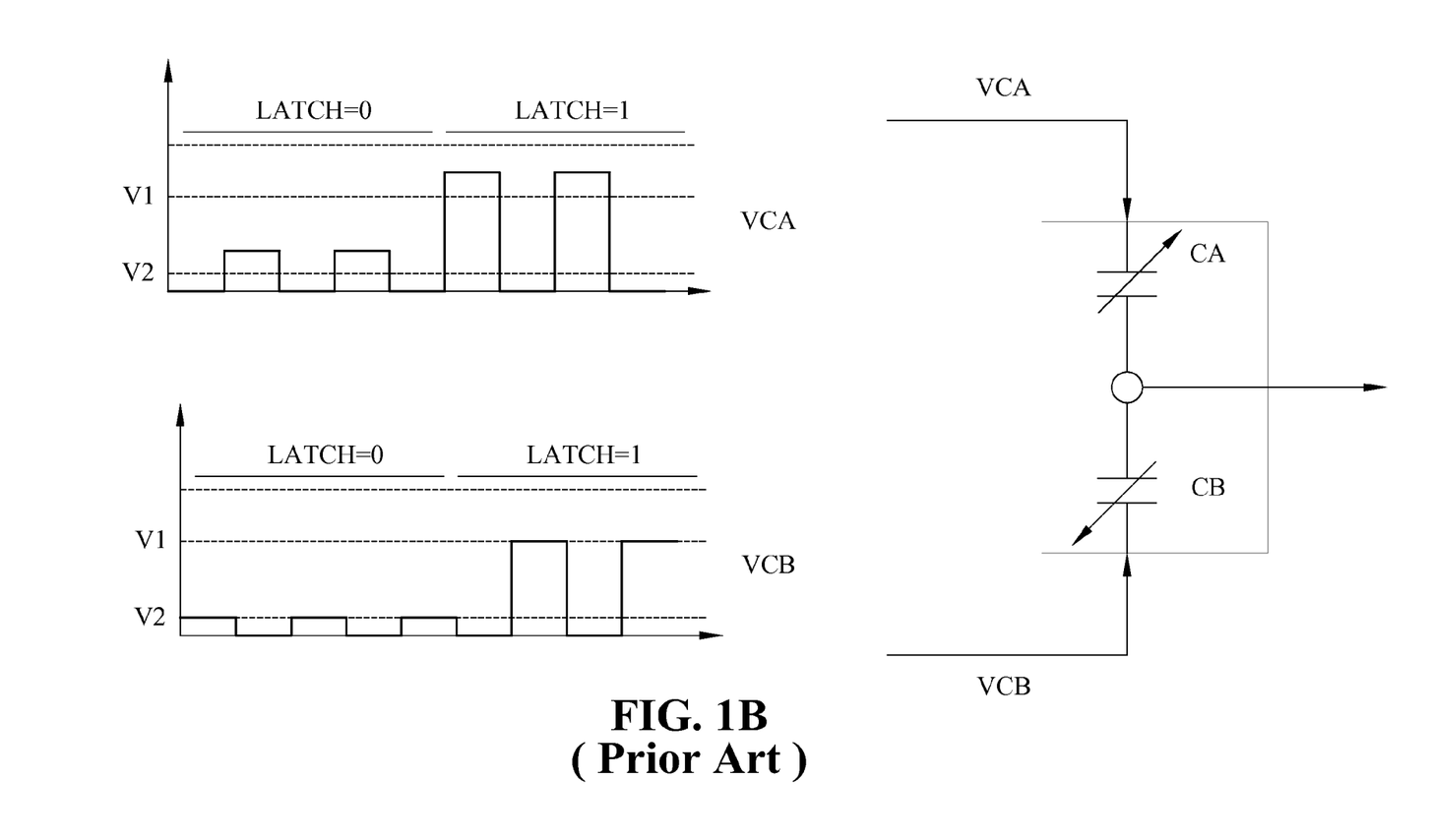

A technology for calibrating shift and sensitivity of device is disclosed in U.S. Pat. No. 5,528,520. As shown in the calibration circuit of FIG. 1A and the calibration method of FIG. 1B, the calibration technology is to use two dependent digital codes of input voltages V1, V2, marked as 101, 102, and a code mirror 120 to generate four analog calibration codes. Then, the following fractional pulse density (FPD) equation is used to calibrate the zero-offset and sensitivity of the device:

$$FPD = B + G[(CA - CB)/(CA + CB)],$$

where zero-offset $B = (\frac{1}{2}) + [VCM - (V1+V2)/2]/(V1-V2)$, and sensitivity $G = (VDD - VCM)(V1 - V2)$.

SUMMARY

The disclosed exemplary embodiments may provide a calibration apparatus and method for capacitive sensing devices.

In an exemplary embodiment, the disclosed relates a calibration apparatus for capacitive sensing devices. The apparatus may comprise a calibration capacitor device, an integration circuit with latch function, at least two first switches, and at least a third switch. One end of the calibration capacitor device is connected to a capacitive sensing device. The integration circuit is connected to the capacitive sensing device and generates a voltage output and a latch output. A transforming circuit transforms a sensitivity calibration parameter into two corresponding analog signal outputs, and transforms a zero-offset calibration parameter into a corresponding analog signal output. The at least two first switches switch between the two corresponding analog signal outputs and a fixed voltage according to a system clock. The third switch switches between the corresponding analog signal output and another fixed voltage according to the system clock. The calibration apparatus also determines the switching between the two corresponding analog signal outputs according to the level of the latch output of the integration circuit.

In another exemplary embodiment, the disclosed relates to a calibration method for capacitive sensing devices. The calibration method may comprise: transforming an input sensitivity calibration parameter into two corresponding analog signals and outputting to two ends of a pair of sensing capacitor, transforming an inputted zero-offset calibration parameter into a corresponding analog signal and outputting to a calibration capacitive device; through a plurality of switches and according to a system clock and a latch output result of an integration circuit, performing the switching for the two corresponding analog signal outputs, the corresponding analog signal output and two fixed voltages; independently adjusting the value of the sensitivity calibration parameter and the value of the zero-offset calibration parameter so that the characteristics of a sensing device formed by a pair of sensing capacitors matching a sensitivity specification and a zero offset specification; and reading the output of the pair of sensing capacitors and generating a calibrated voltage output.

The foregoing and other features and aspects of the disclosed exemplary embodiments will become better understood from a careful reading of a detailed description provided herein below with appropriate reference to the accompanying drawings.

DETAILED DESCRIPTION

The disclosed exemplary embodiments use two independent digital calibration codes to handle voltage control of the zero offset and sensitivity analog drive of the sensing device. By changing any calibration code of the device offset or sensitivity alone, the exemplary embodiments may accomplish the independent calibration of the zero offset or sensitivity of a sensing device, where the capacitor used in calibration may be a programmable calibration capacitor to improve the calibration precision of zero offset.

Figure 2:
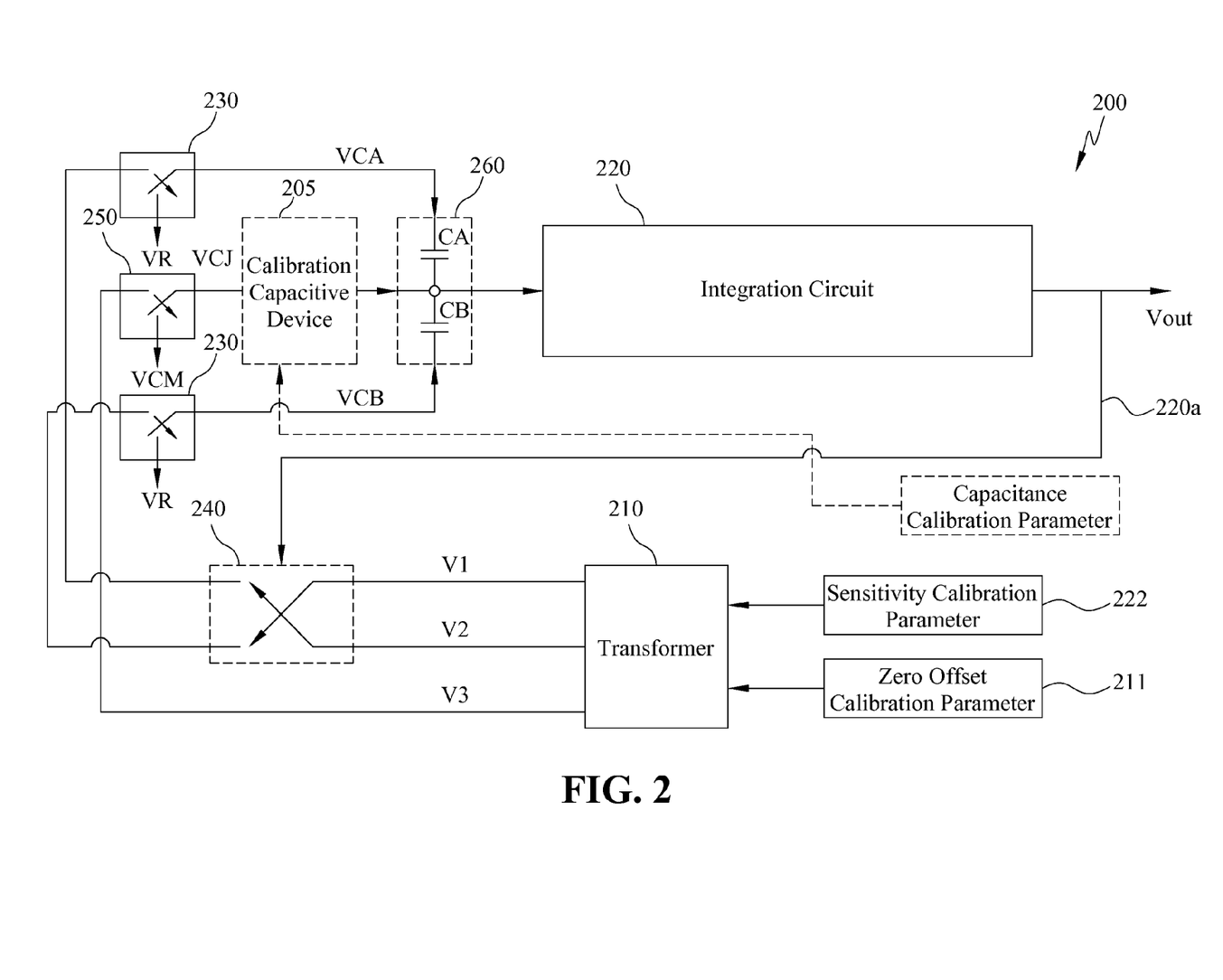
FIG. 2 shows an exemplary schematic view of a calibration apparatus for capacitive sensing devices, consistent with certain disclosed embodiments.

FIG. 2 shows an exemplary schematic view of a calibration apparatus for capacitive sensing devices, consistent with certain disclosed embodiments. Referring to FIG. 2, calibration apparatus 200 may comprise a calibration capacitive device 205, a transformer 210, an integration circuit 220 with a latch function, at least two first switches 230, and at least a third switch 250. One end of calibration capacitive device 205 is connected to a capacitive sensing device 260. Calibration capacitive device 205 includes at least a calibration capacitor.

Integration circuit 220 is connected to capacitive sensing device 260, and is responsible for reading a sensing capacitance and generating a corresponding voltage output $V_{OUT}$ and a latch output.

Transformer 210 transforms an inputted zero offset calibration parameter 211 into a corresponding analog signal output, such as, analog calibration voltage V3, and transforms an inputted sensitivity calibration parameter 222 into two corresponding analog signal outputs, such as, a pair of analog calibration voltages (V1 and V2). Analog calibration voltage V3 may be outputted through third switch 250 to calibration capacitive device 205, and analog calibration voltages V1 and V2, for example, may be outputted through at least a second switch 240 and at least two first switches 230 to the ends of a pair of sensing capacitors (CA and CB) so as to adjust the characteristic to match an zero offset specification and a sensitivity specification.

In other words, transformer 210 transforms inputted sensitivity calibration parameter 211 and zero offset calibration parameter 222 into calibration voltages, such as, calibration voltages V1, V2, V3, and outputs the voltages through the switches to the ends of a capacitive sensing device and a calibration capacitor so as to adjust the characteristic to within the specifications of zero offset and sensitivity.

At least two first switches 230 and at least a third switch 250, according to the high and low of a clock level, performs switching of analog calibration voltages, such as, V1, V2, V3. Based on the high and low levels of the latch output of integration circuit 220, calibration apparatus 200 determines the switching of two corresponding signal outputs. For example, based on the latch output result of integration circuit 220, the calibration apparatus may use at least a second switch 240 to switch between the two corresponding signal outputs. In other words, through at least two first switches 230 and at least a second switch 240 and at least a third switch 250, calibration apparatus 200 may use the clock and the high and low levels 220a of the latch output of integration circuit 220 to control the voltages on the upper and lower electroplates of the capacitive device.

Take FIG. 2 as an example. Two first switches 230 perform the switching of two corresponding analog signals (V1, V2) provided by transformer 210 and a fixed voltage VR according to the high and low levels of a system clock. Third switch 250 performs the switching of a corresponding analog signals V3 provided by transformer 210 and a fixed voltage VCM according to the high and low levels of system clock. The two outputs of second switch 240 perform the switching of two analog signals V1, V2 provided by transformer 210 according to the high and low levels of latch output 220a of integration circuit 220. Fixed voltage VR is higher than or equal to zero voltage and is lower than or equal to power supply voltage, and voltage VR may be power supply voltage, zero voltage or other fixed voltages. Another fixed voltage VCM is higher than or equal to zero voltage and is lower than or equal to power supply voltage, and voltage VCM may be half of the power supply voltage or other fixed voltages.

Calibration apparatus 200 may comprise sensing capacitance 260. Sensing capacitance 260 may be a three-end capacitive sensing device formed by sensing capacitors CA and CB, where one end is common to sensing capacitors CA and CB and the other two ends are the other two ends of sensing capacitors CA and CB. Sensing capacitors CA and CB may be differential, at least one variable capacitor, at least a fixed capacitor, or any combination of the above capacitors, where nodes VCJ, VCA and VCB are the two voltages of calibration capacitive device 205, sensing capacitors CA and CB, respectively. Calibration capacitive device 205 may be programmable capacitor or fixed capacitance or any combination of the above.

Figure 3:
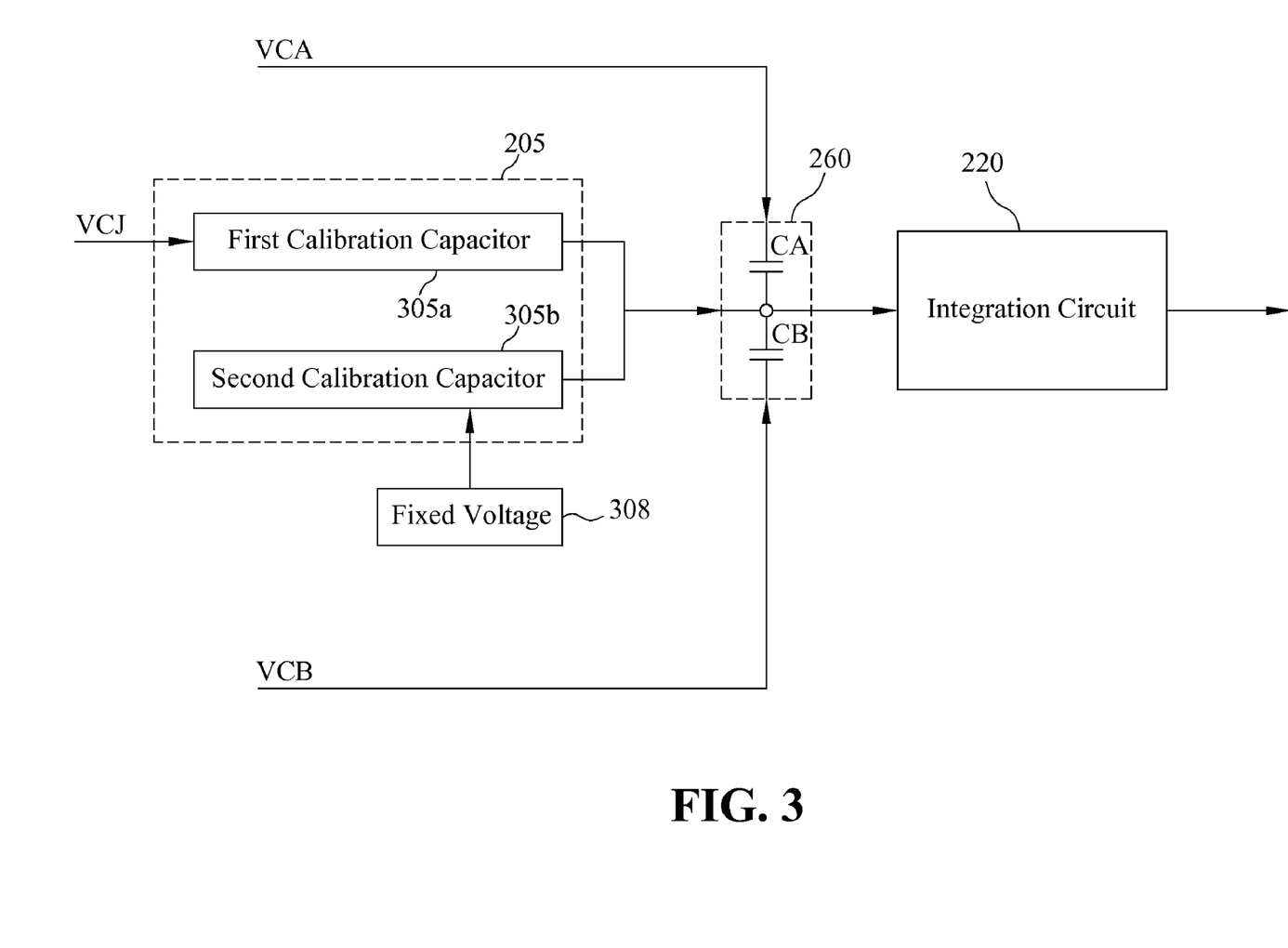
FIG. 3 shows an exemplary connection structure between a calibration capacitive device and a sensing device in a normal mode, consistent with certain disclosed embodiments.

Calibration apparatus 200 may operate in a normal mode or in a self-test mode. When operating in a normal mode, as shown in FIG. 3, node VCA is connected to sensing capacitor CA, node VCB is connected to sensing capacitor CB, while one end of calibration device 205 is connected to node VCJ and the other end is connected to a fixed voltage 308. Calibration capacitive device 205 may be realized in various structures; for example, calibration capacitive device 205 may include a first calibration capacitor 305a and a second calibration capacitor 305b, where one end of first calibration capacitor 205a is connected to node VCJ and the other end of first calibration capacitor 305a is the common end with second calibration node 305b and is connected to capacitive sensing device 260, while the other end of second calibration capacitor 305b is connected to fixed voltage 308. When calibration apparatus 200 operates in the normal mode, calibration apparatus 200 reads the values of sensing capacitors CA and CB. First calibration capacitor 305a and second calibration capacitor 305b may both be programmable capacitors, fixed capacitors, or any combination of the above.

Figure 4:
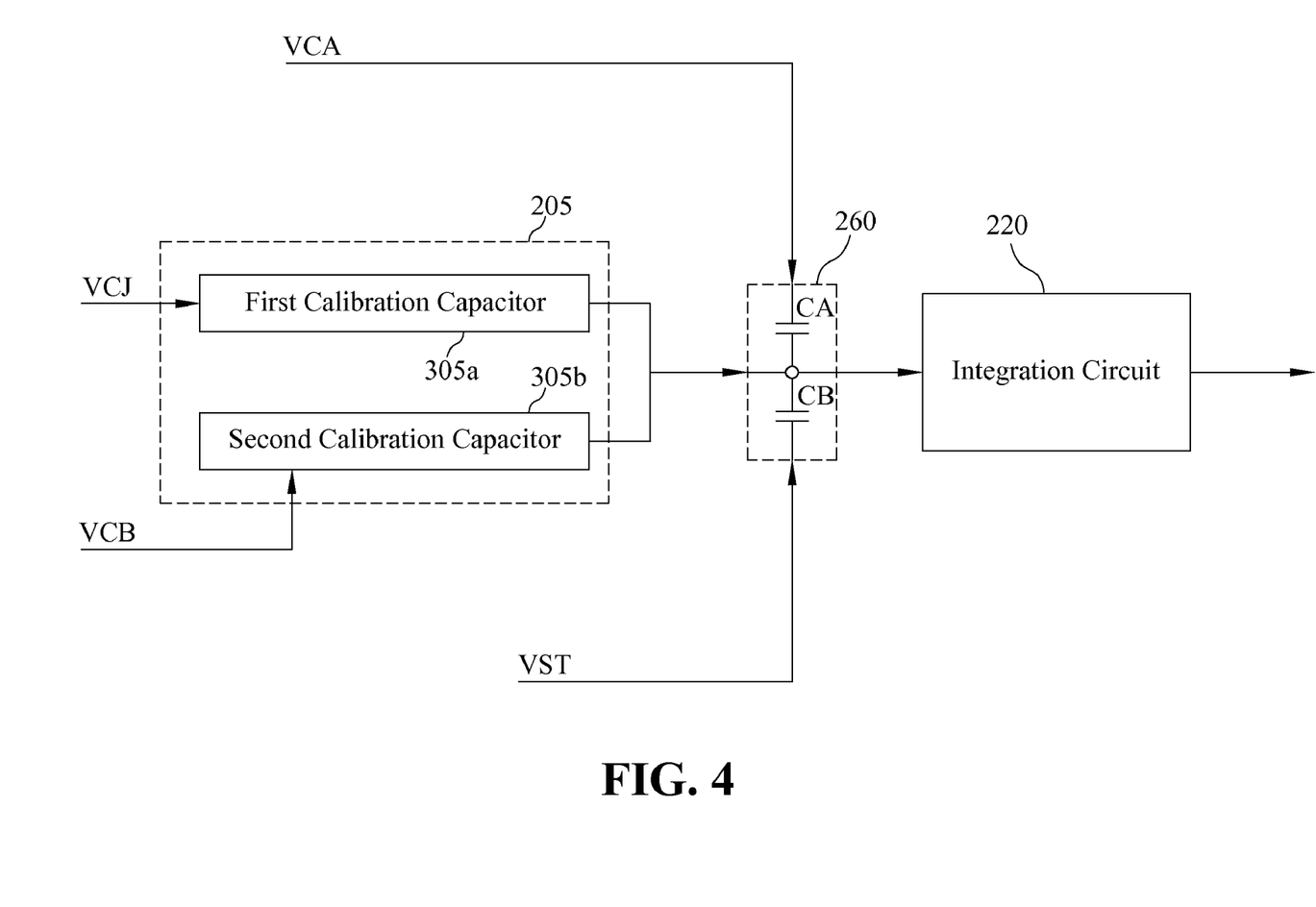
FIG. 4 shows an exemplary connection structure between a calibration capacitive device and a sensing device in a self-test mode, consistent with certain disclosed embodiments.

When operating in self-test mode, as shown in FIG. 4, node VCA is connected to sensing capacitor CA, node VCB is connected to one end of second calibration capacitor 305b, node VCJ is connected to one end of first calibration capacitor 305a while a self-test voltage VST is connected to sensing capacitor CB. External voltage VST may use electrostatic force to change the capacitance of differential capacitors CA and CB to perform self test.

Figure 5A:
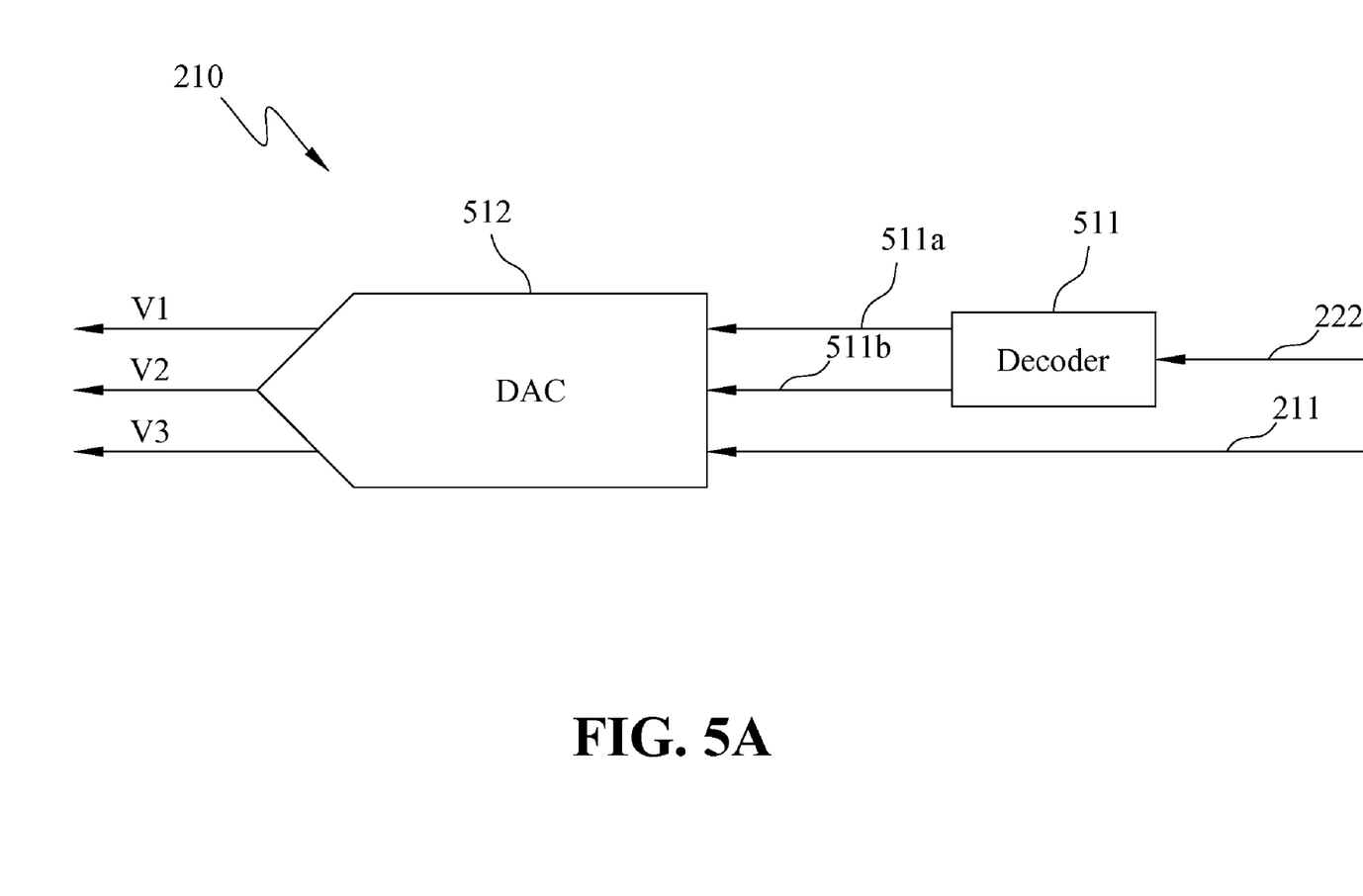
FIG. 5A shows a schematic view of an exemplary transformer, consistent with certain disclosed embodiments.

As shown in FIG. 5A, transformer 210 may include a decoder 511 and a digital-to-analog converter (DAC) 512. Decoder 511 decodes sensitivity parameter 222 into two symmetric parameters 511a, 511b, and DAC 512 transforms symmetric parameters 511a, 511b into two analog output voltages V1, V2. DAC 512 transforms input parameters, including two symmetric parameters 511a, 511b and zero offset calibration parameter 211 into analog voltage outputs, including V1, V2 and V3.

Figure 5B:
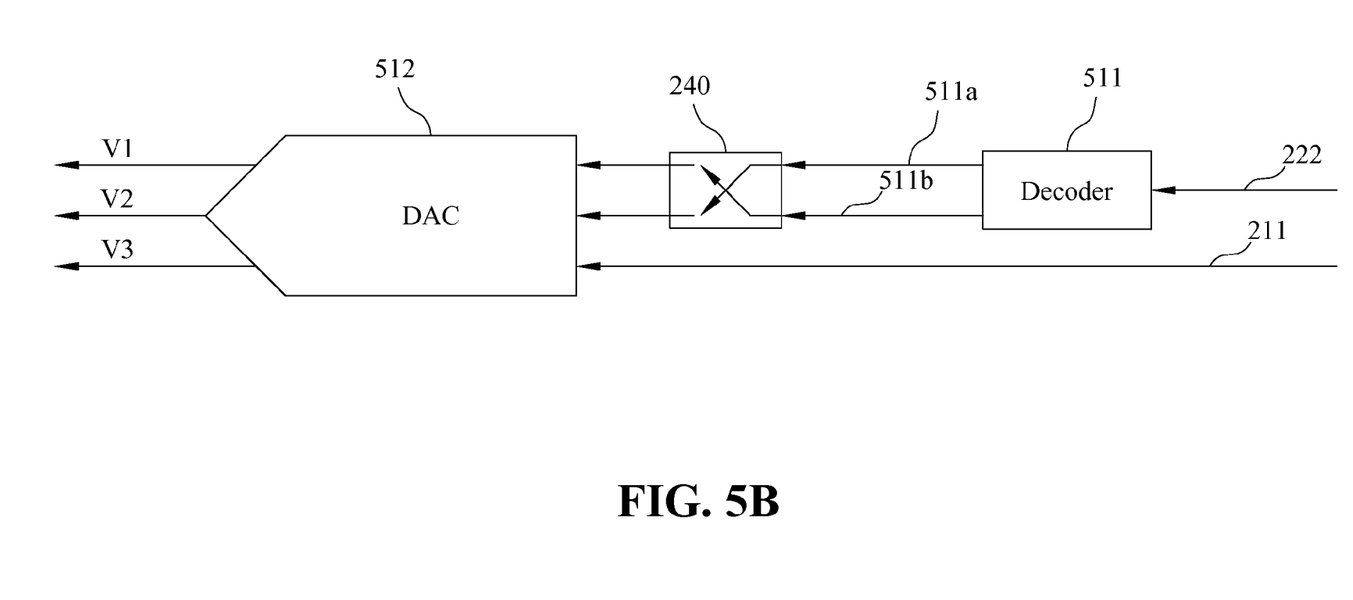
FIG. 5B shows a schematic view of another exemplary transformer, consistent with certain disclosed embodiments.

As shown in FIG. 5B, at least a second switch 240 may be placed inside transformer 210 between decoder 511 and DAC 512, to perform switching between two symmetric parameters 511a, 511b according to the high and low levels of latch output 220a of integration circuit 220, and outputs to DAC 512.

Integration circuit 240 may be a Sigma-Delta modulator realized, for example, with an integrator, a comparator and a latch.

Figure 6:
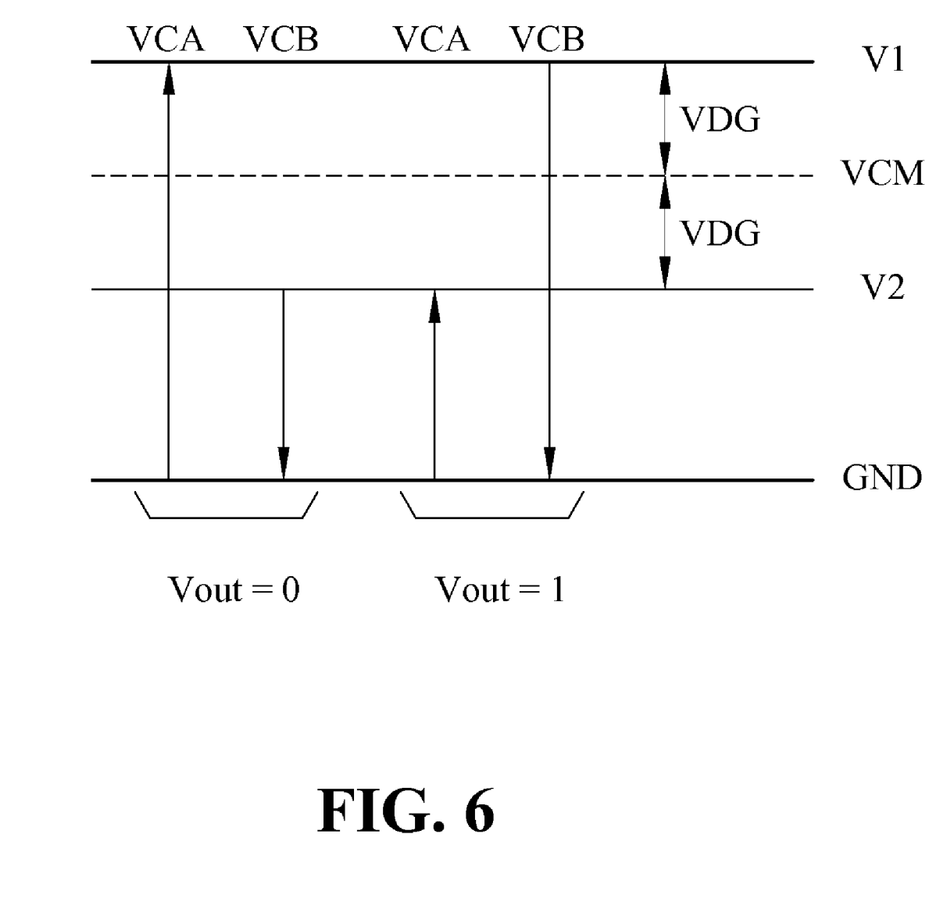
FIG. 6 shows an exemplary schematic view of voltage transformation of a calibration voltage, consistent with certain disclosed embodiments.

FIG. 6 shows an exemplary schematic view of voltage transformation of a calibration voltage, consistent with certain disclosed embodiments, where VDG is the voltage difference between V1 and VCM, or between V2 and VCM. VCM is the common mode voltage, and GND is the ground. As shown in FIG. 6, the voltage transformation relation among VDG, VCM, V1 and V2 is:

$$VDG=(V1-V2)/2, VCM=(V1+V2)/2;$$

i.e., V1=VCM+VDG, V2=VCM−VDG.

The overall output voltage VOUT of calibration apparatus 200 may be expressed as the following equation:

$$VOUT=VDD\times\{\tfrac{1}{2}+(VJ/2VDG)\times[CJ/(CA+CB)]+(VCM/2VDG)\times[(CA-CB)/(CA+CB)]\},$$

where CJ is the calibration capacitance of calibration capacitive device 205, VJ=V3−VCM.

As shown in the above equation, through changing VJ and CJ, the zero offset may be adjusted, i.e., the result of $\{\tfrac{1}{2}+(VJ/2VDG)\times[CJ/(CA+CB)]\}$. The calibration of two parameters may greatly improve the precision of zero offset, while changing VDG may adjust sensitivity, i.e., the output result of $\{(VCM/2VDG)\times[(CA-CB)/(CA+CB)]\}$. Because VDG and VJ are independent calibration parameters, changing any parameter of zero offset or sensitivity of the device alone may accomplish the independent calibration of the zero offset or sensitivity. In comparison with the dependent calibration, this independent calibration method may improve the ease of calibration.

Figure 7A:
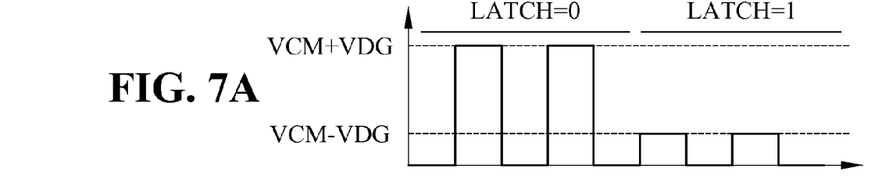
FIG. 7A-FIG. 7D show the use of two independent calibration codes to control the voltages of the upper and lower electroplates of capacitive device, by a system clock and an output of an integration circuit, consistent with certain disclosed embodiments.
Figure 7B:
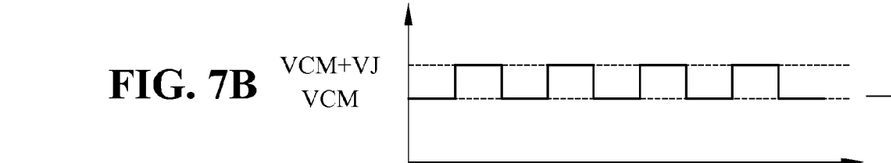
Figure 7C:
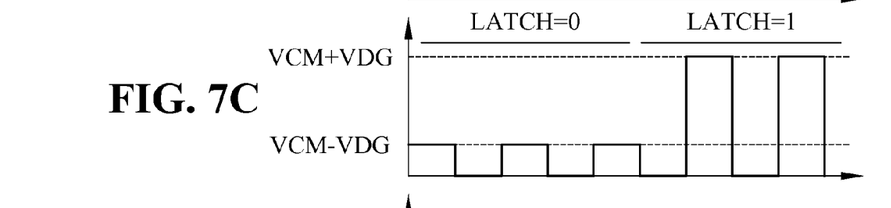
Figure 7D:
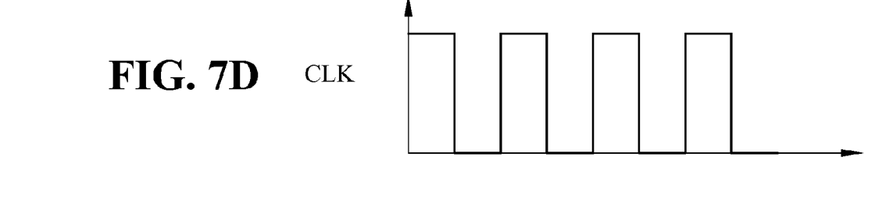

FIG. 7A-FIG. 7D further show the use of two independent codes VDG, VJ through clock and the output of integration circuit to control the voltages of the upper and lower electroplates of the capacitive device, consistent with certain disclosed embodiments. FIG. 7A shows the voltage transformation of VCA, FIG. 7B and FIG. 7C show voltage transformations of VCB and VCJ respectively, and FIG. 7D shows an exemplary schematic view of the clock switching.

In the examples of FIGS. 7A-7C, at least two first switches 230 and at least a second switch 240 may be, such as, Delta Sigma symmetric design, and control the voltages of the upper and lower electroplates of the capacitive device through clock and the latch output of the integration circuit. When latch output is logic 0 (low), second switch 240 stays the same, and directly passes outputs V1, V2 from transformer 210 to the first switch set for clock switching. When latch output is logic 1 (high), second switch 240 exchanges outputs V1, V2 from transformer 210, and passes to first switch 230 for clock switching. In this manner, the switching between different voltages may be used to accomplish the calibration of zero offset and sensitivity of the capacitive device.

FIGS. 7A-7C show how to use the clock and latch output of the integration circuit to control the voltage of the upper and lower electroplates of a differential capacitive device. In the example of FIG. 7A, the upper electroplate uses calibration voltage V1=VCM+VDG when latch output LATCH=0 (low), and uses calibration voltage V2=VCM−VDG when latch output LATCH=1 (high), and outputs to sensing capacitor CA for the independent calibration of sensitivity. In the example of FIG. 7C, the lower electroplate uses calibration voltage V2=VCM−VDG when latch output LATCH=0 (low), and uses calibration voltage V1=VCM+VDG when latch output LATCH=1 (high), and outputs to sensing capacitor CB for the independent calibration of sensitivity.

FIG. 7B describes the use of zero offset calibration parameter. Output V3 of transformer 210, through clock control, is outputted to the common end of the sensing capacitor through programmable calibration capacitor CJ to perform the independent calibration of the zero offset. Hence, the disclosed calibration apparatus 200 may use two independent calibration codes VDG, VJ to independently change the offset and sensitivity of the sensing device.

Calibration parameters, such as, zero offset calibration parameter 211, sensitivity calibration parameter 222, or capacitive calibration parameter, may be pre-stored in a storage device. The storage device may also store at least an adjustment value of sensitivity calibration parameter 222, and at least an adjustment value of zero offset calibration parameter 211.

Figure 8:
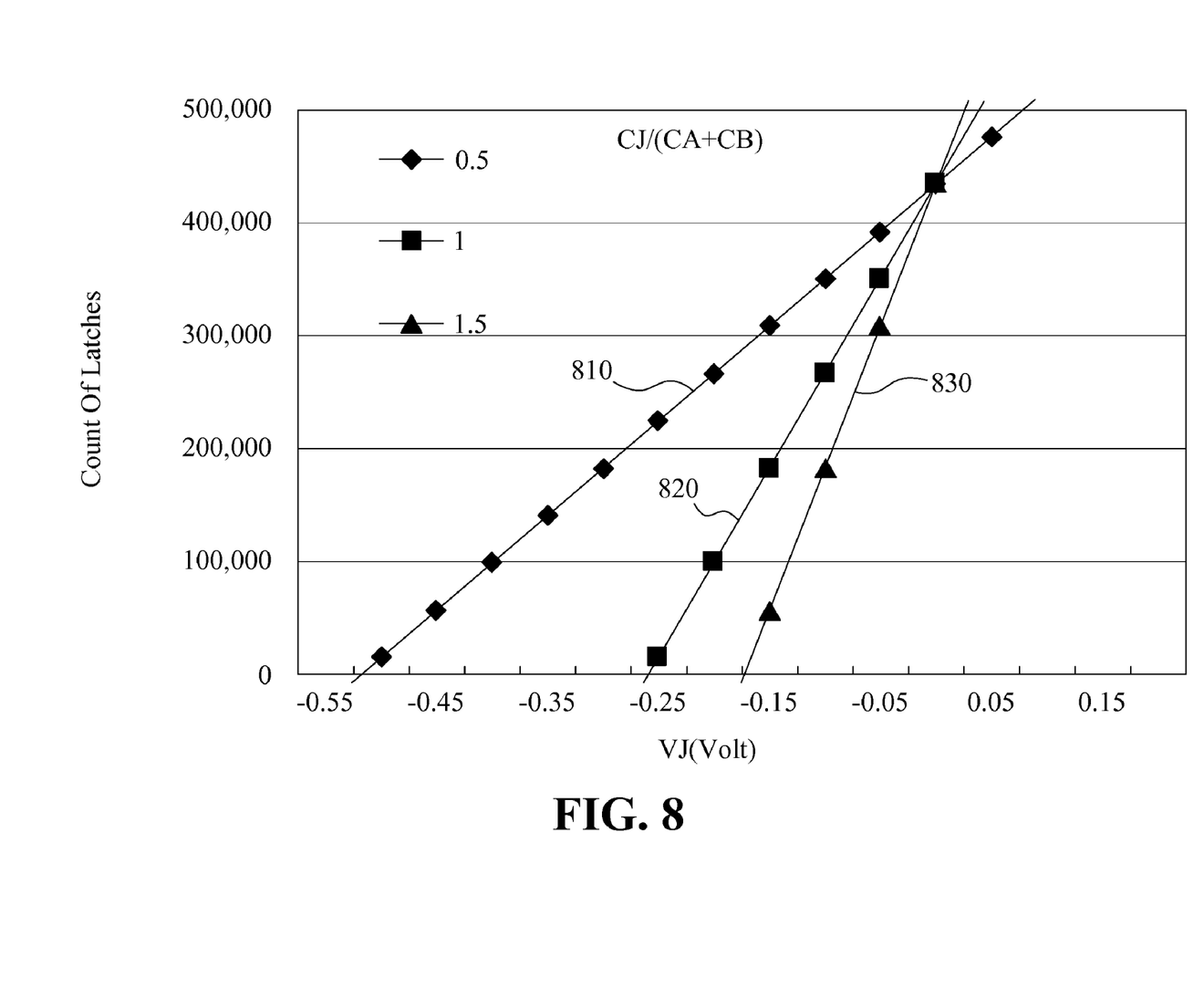
FIG. 8 shows the change of slope of a calibration curve by adjusting the calibration capacitance of a programmable capacitor, consistent with certain disclosed embodiments.

The adjustment of the capacitance of calibration capacitor CJ of calibration capacitive device 205 may change the slope of the calibrates curve, i.e., CJ/(CA+CB), so that the circuit may effectively reduce the margin tolerance of zero offset when calibrating the offset, as shown in the example of FIG. 8. In FIG. 8, the x-axis is the analog calibration voltage VJ, with unit volt, and the y-axis is the count of latches, with a clock of 500 KHZ. Calibration curves 810, 820, 830 are the transformation results of CJ/(CA+CB) at the ratio of 0.5, 1.0, 1.5, respectively.

Figure 9:
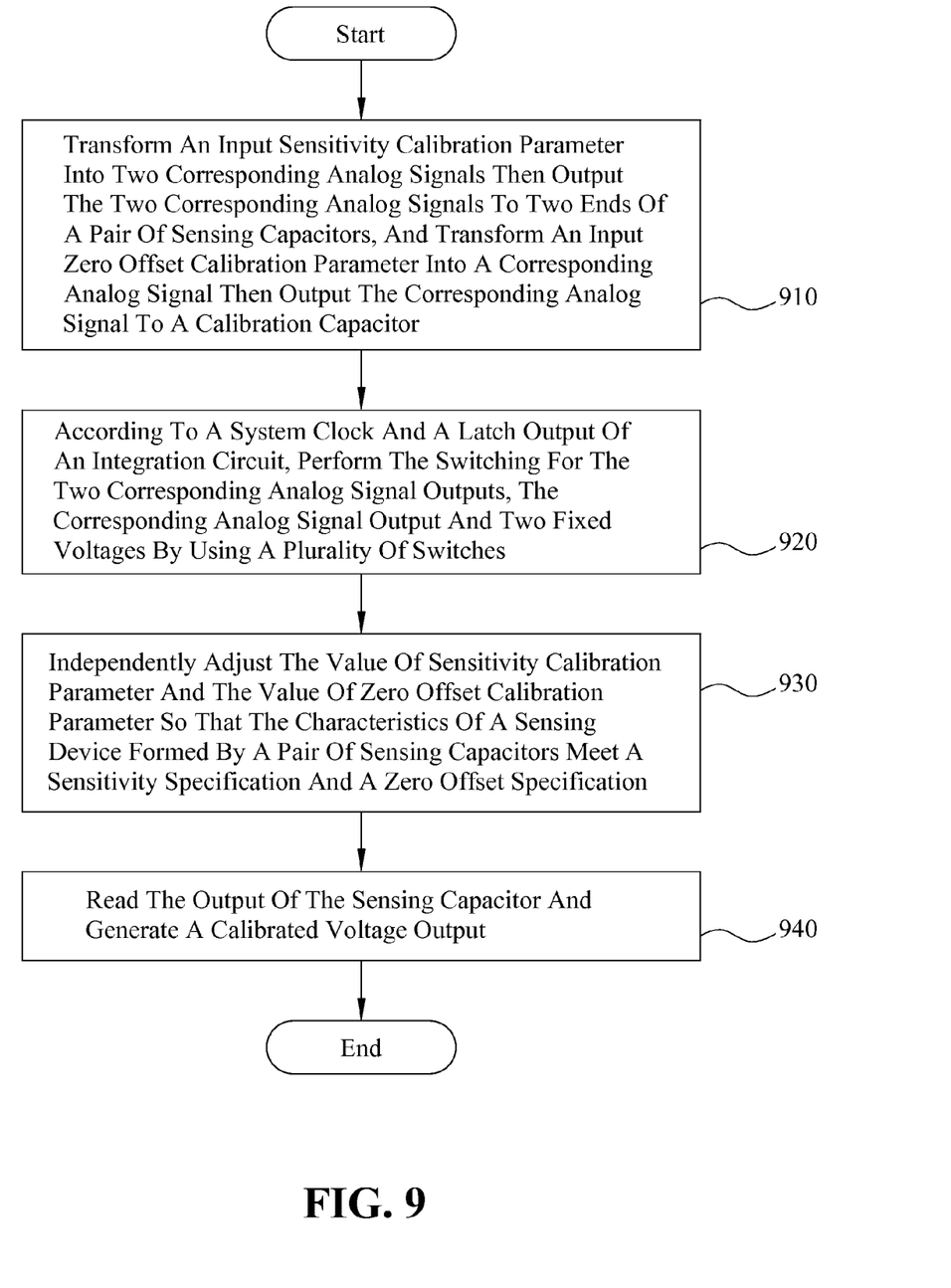
FIG. 9 shows an exemplary flowchart of a calibration method for capacitive sensing devices, consistent with certain disclosed embodiments.

FIG. 9 shows an exemplary flowchart of a calibration method for capacitive sensing devices, consistent with certain disclosed embodiments. Referring to FIG. 9, an inputted sensitivity calibration parameter is transformed into two corresponding analog signals then the two corresponding analog signals are outputted to two ends of a pair of sensing capacitors, and an input zero offset calibration parameter is transformed into a corresponding analog signal then the corresponding analog signal is outputted to a calibration capacitor, as shown in step 910. In step 920, according to a system clock and a latch output of an integration circuit, a plurality of switches are used to perform the switching for the two corresponding signal outputs, the corresponding analog signal output and two fixed voltages.

In step 930, the method independently adjusts the value of sensitivity calibration parameter and the value of zero offset calibration parameter so that the characteristics of a sensing device formed by a pair of sensing capacitors meet a sensitivity specification and a zero offset specification. In step 940, the output of the sensing capacitor is read and a calibrated voltage output is generated.

In step 920, the plurality of switches at least includes a second switch, two first switches, and a third switch. As described, second switch switches between two corresponding analog signal outputs according to the high and low levels of the latch output of the integration circuit, two first switches switch between the two corresponding analog signal outputs and the fixed voltage VR according to the high and low levels of system clock, and third switch switches between the corresponding analog signal output and another fixed voltage VCM according to the high and low levels of system clock. Through these switches, the switching of three analog calibration signal outputs may be performed by such as, Delta Sigma symmetric design.

Figure 10:
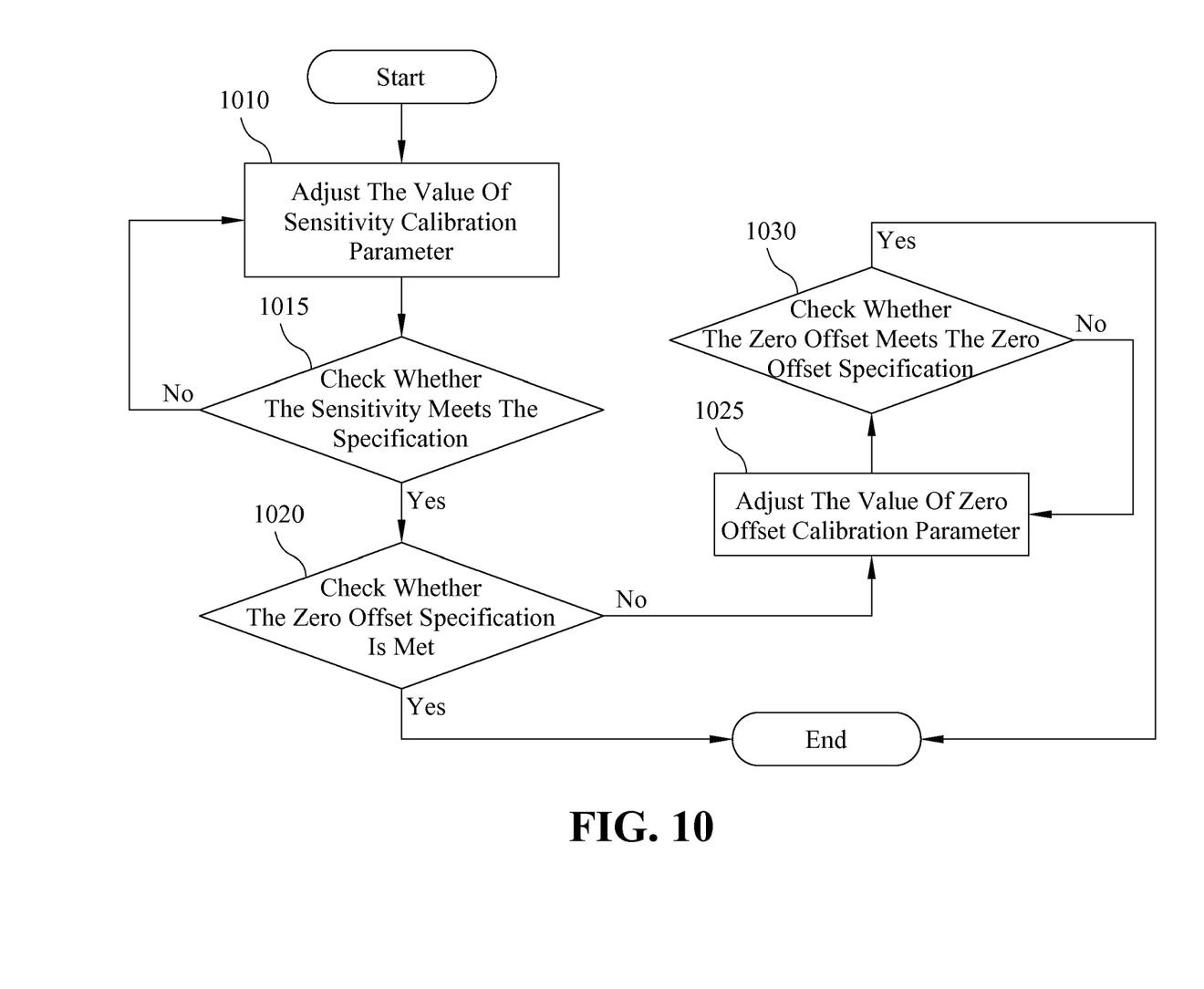
FIG. 10 shows an exemplary flowchart of changing zero offset parameter or sensitivity calibration parameter alone to independently calibrate zero offset or sensitivity, consistent with certain disclosed embodiments.

The exemplary flowchart of FIG. 10 further describes how step 920 independently adjust the characteristics of sensing device to respectively meet a zero offset specification and a sensitivity specification, consistent with certain disclosed embodiments. As shown in FIG. 10, the independent adjustment of sensitivity and zero offset calibration parameters may be executed until the specifications are met.

First, the value of sensitivity calibration parameter is adjusted (step 1010) and whether the sensitivity meets the specification is checked (step 1015), until the sensitivity specification is met. Then, whether the zero offset specification is met is checked (step 1020); if so, the process terminates; otherwise, after inputting zero offset calibration parameter, the value of zero offset calibration parameter is adjusted (step 1025), and whether the zero offset meets the zero offset specification is checked (step 1030), until the zero offset specification is met.

Figure 11:
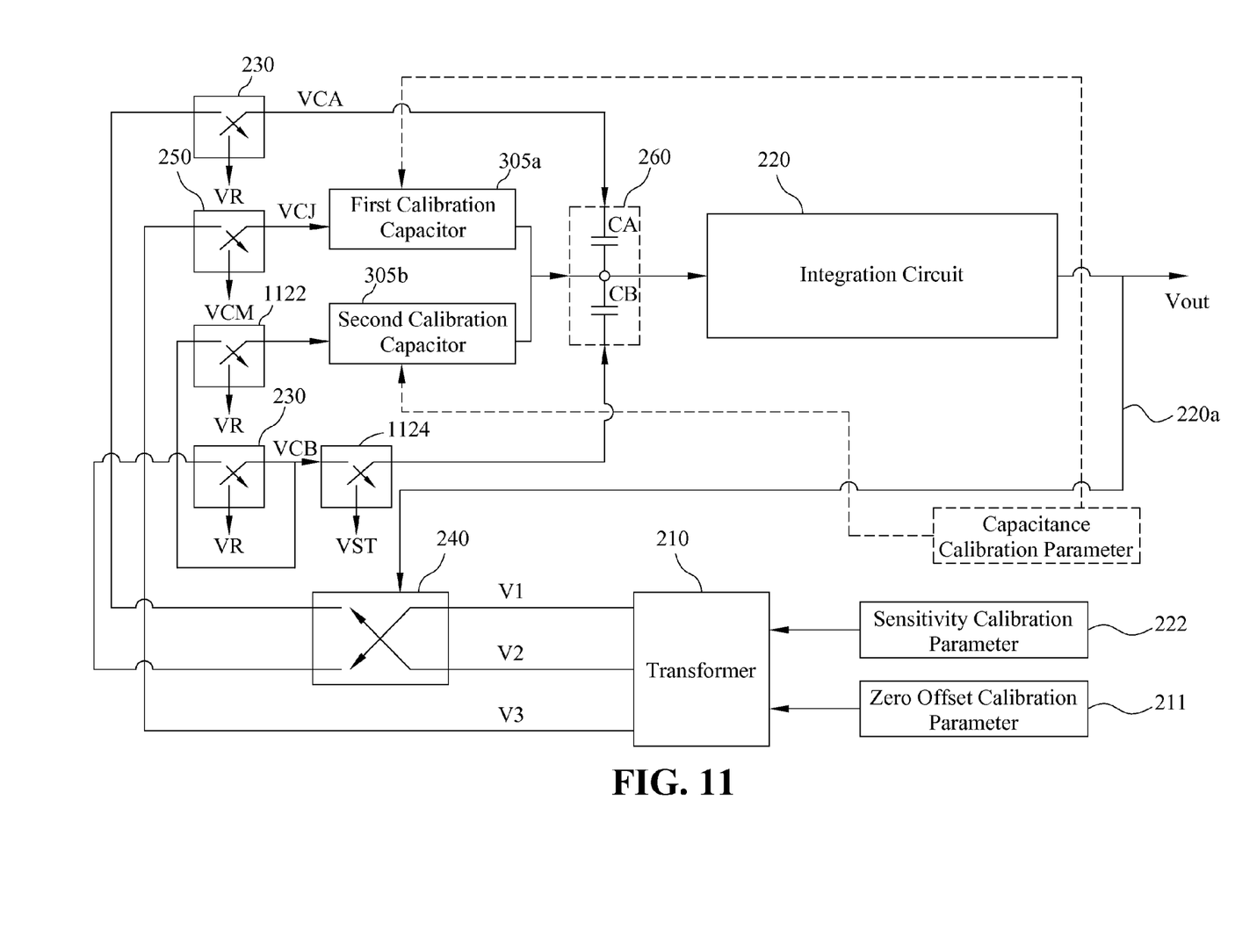
FIG. 11 shows an exemplary schematic view illustrating how to use switch outputs and a fixed voltage/self-test voltage to perform normal mode or self-test mode, consistent with certain disclosed embodiments.

Recall the exemplary embodiment of FIG. 4. The disclosed calibration apparatus may also operate in a self-test mode. The exemplary embodiment may further include two switches to perform the self-test mode. FIG. 11 shows an exemplary schematic view illustrating how to use switch outputs and a fixed voltage VR/self-test voltage VST to perform normal mode or self-test mode, consistent with certain disclosed embodiments.

Referring to FIG. 11, calibration apparatus 200 may further include a switch 1122 and another switch 1124. In normal mode, switch 1122 is switched to fixed voltage VR, therefore, one end of second calibration capacitor 305*b* is connected to the fixed voltage VR. In addition, switch 1124 is switched to the output of first switch 230, therefore, sensing capacitor CB is connected to VCB. In self-test mode, switch 1122 is switched to the output of first switch 230, therefore, one end of second calibration capacitor 305*b* is connected to VCB. In addition, switch 1124 is switched to self-test voltage VST, i.e., sensing capacitor CB is connected to self-test voltage VST, therefore, the test of the sensing device may be performed with voltage VST.

In summary, the disclosed calibration apparatus and method for capacitive sensing devices use independent digital calibration parameters and uses a system clock and integration circuit output to control the voltages of capacitive devices so that a calibration capacitive device may change the calibration voltage according to the system clock. In this manner, the overall voltage of the sensing device may be adjusted for calibrating the zero offset and sensitivity. In addition to providing the independent zero offset and sensitivity and greatly reducing calibration complexity, the disclosed exemplary embodiments may effectively reduce the zero offset margin tolerance in the calibration capacitive device design to achieve high precision. The disclosed calibration apparatus for a capacitive sensing device may also perform the self test.

Although the present invention has been described with reference to the disclosed exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A calibration apparatus for capacitive sensing devices, comprising:
    a calibration capacitive device having at least a calibration capacitor, said calibration capacitor having one end connected to a capacitive sensing device;
    an integration circuit with a latch function, connected to said capacitive sensing device and generating a voltage output and a latch output;
    a transformer for transforming a sensitivity calibration parameter into two corresponding analog signal outputs, and a zero offset calibration parameter into a corresponding analog signal output;
    at least two first switches, switching between said two corresponding analog signals outputs and a fixed voltage according to high and low levels of a system clock; and
    at least a third switch, switching between said corresponding analog signal output and another fixed voltage according to high and low levels of said system clock;
    wherein said apparatus determines switching between said two corresponding signal outputs according to high and low levels of said latch output of said integration circuit.

2. The calibration apparatus as claimed in claim 1, wherein said fixed voltage is higher than or equal to zero and lower than or equal to a power supply voltage.

3. The calibration apparatus as claimed in claim 1, wherein said another fixed voltage is higher than or equal to zero and lower than or equal to a power supply voltage.

4. The calibration apparatus as claimed in claim 1, wherein said transformer further includes:
    a decoder decoding said sensitivity calibration parameter into two symmetric parameters; and
    a digital-to-analog convertor (DAC) transforming said two symmetric parameters into said two corresponding analog signal outputs, and transforming said zero offset calibration parameter into said corresponding analog signal output.

5. The calibration apparatus as claimed in claim 4, wherein said transformer further includes at least a second switch located between said decoder and said DAC, said at least a second switch switches between said two symmetric parameters according to high and low levels of said latch output of said integration circuit and then outputs to said DAC.

6. The calibration apparatus as claimed in claim 1, wherein said integration circuit is a sigma-delta modulator formed by an integrator, a comparator and a latch.

7. The calibration apparatus as claimed in claim 1, wherein said capacitive sensing device is a full differential capacitor.

8. The calibration apparatus as claimed in claim 1, wherein said capacitive sensing device includes at least a variable capacitor, at least a fixed capacitor, or any combination of the above.

9. The calibration apparatus as claimed in claim 1, wherein said calibration capacitive device includes at least a fixed capacitor, at least a variable capacitor and at least a programmable capacitor, or any combination of the above.

10. The calibration apparatus as claimed in claim 9, wherein said calibration capacitive device adjusts capacitance through a programmable capacitance calibration parameter to improve the precision of a zero offset.

11. The calibration apparatus as claimed in claim 1, said apparatus further includes a storage device, said storage device at least stores at least an adjustment value of said sensitivity calibration parameter, and at least an adjustment value of said zero offset calibration parameter.

12. The calibration apparatus as claimed in claim 1, said apparatus further includes said capacitive sensing device, and said capacitive sensing device is a three-end capacitive sensing device formed by a first sensing capacitor and a second sensing capacitor, wherein one end is common end of said first sensing capacitor and said second sensing capacitor, and remaining two ends are the other two ends of said first sensing capacitor and said second sensing capacitor.

13. The calibration apparatus as claimed in claim 12, wherein said calibration capacitive device includes a first calibration capacitor and a second calibration capacitor, and when said apparatus operating in a self-test mode, voltage of said first sensing capacitor is connected to said first sensing capacitor, said voltage of said second sensing capacitor is connected to said second calibration capacitor, voltage of said first calibration capacitor is connected to said first calibration capacitor, and a self-test voltage is connected to said second sensing capacitor.

14. The calibration apparatus as claimed in claim 13, wherein voltage of said second sensing capacitor uses at least two extra switches to switch output to said second sensing capacitor and said second calibration capacitor, and uses said self-test voltage to change capacitances of said first and said second sensing capacitors to perform a self test of said apparatus.

15. The calibration apparatus as claimed in claim 12, wherein said calibration capacitive device includes a first calibration capacitor and a second calibration capacitor, and when said apparatus operating in a normal mode, said apparatus reads said first and said second sensing capacitors, voltage of said first sensing capacitor is connected to said first sensing capacitor, said voltage of said second sensing capacitor is connected to said second sensing capacitor, voltage of said first calibration capacitor is connected to said first calibration capacitor, and said second calibration capacitor is connected to a fixed voltage.

16. The calibration apparatus as claimed in claim 12, wherein said end of said calibration capacitive device is connected to the common end of said two sensing capacitors.

17. The calibration apparatus as claimed in claim 12, wherein said at least a second switch has at least two outputs and said at least two outputs are connected to said at least two first switches respectively.

18. The calibration apparatus as claimed in claim 12, wherein said at least two first switches at least have two outputs, and said two outputs are respectively connected to said the other two ends of said two sensing capacitors.

19. The calibration apparatus as claimed in claim 1, said apparatus further includes at least a second switch for switching between said two corresponding analog signal outputs.

20. The calibration apparatus as claimed in claim 1, wherein said at least a third switch at least has an output and said output is connected to the other end of said calibration capacitive device.

21. A calibration method for capacitive sensing devices, comprising:
transforming an inputted sensitivity calibration parameter into two corresponding analog signal and outputting to two ends of a pair of sensing capacitors, and transforming an inputted zero offset calibration parameter into a corresponding analog signal and outputting to a calibration capacitive device;
through a plurality of switches and according to a system clock and a latch output of an integration circuit, switching between said two corresponding analog signal outputs, said corresponding analog signal output and two fixed voltages;
independently adjusting value of said sensitivity calibration parameter and value of said zero offset calibration parameter so that characteristics of a sensing device formed by a pair of sensing capacitors meeting a sensitivity specification and a zero offset specification; and
reading an output of said pair of sensing capacitors and generating a calibrated voltage output.

22. The calibration method as claimed in claim 21, wherein said independently adjusting value of said sensitivity calibration parameter and value of said zero offset calibration parameter further includes:
adjusting value of said sensitivity calibration parameter to determine whether meeting said sensitivity specification, until said sensitivity specification being met; and
determining whether meeting said zero offset specification; if not, continuing adjusting value of said zero offset calibration parameter until said zero offset specification being met.

23. The calibration method as claimed in claim 21, wherein said two fixed voltages are higher than or equal to zero and lower than or equal to a power supply voltage.

24. The calibration method as claimed in claim 21, wherein said a plurality of switches further includes at least a second switch, two first switches and a third switch, said switching between said two corresponding analog signal outputs, said corresponding analog signal output and two fixed voltages further includes:
said second switch switching between said two corresponding analog signal outputs according to high and low levels of said latch output of said integration circuit;
said two first switches switching between said two corresponding analog signal outputs and one of said two fixed voltages according to high and low levels of said system clock; and
said third switch switching between said corresponding analog signal output and the other of said two fixed voltages according to said system clock.

25. The calibration method as claimed in claim 21, further including:
through a programmable capacitance calibration parameter, adjusting capacitance of said calibration capacitive device to improve precision of said zero offset.

* * * * *